(12) United States Patent
Yokota et al.

(10) Patent No.: US 8,419,259 B2
(45) Date of Patent: Apr. 16, 2013

(54) BACKLIGHT UNIT

(75) Inventors: Hiroshi Yokota, Saitama (JP); Yasumaro Toshima, Saitama (JP)

(73) Assignee: Kimoto Co., Ltd., Tokyo (JP)

( * ) Notice: Subject to any disclaimer, the term of this patent is extended or adjusted under 35 U.S.C. 154(b) by 763 days.

(21) Appl. No.: 12/531,440

(22) PCT Filed: Mar. 19, 2008

(86) PCT No.: PCT/JP2008/055093
§ 371 (c)(1),
(2), (4) Date: Sep. 15, 2009

(87) PCT Pub. No.: WO2008/117720
PCT Pub. Date: Oct. 2, 2008

(65) Prior Publication Data
US 2010/0103698 A1 Apr. 29, 2010

(30) Foreign Application Priority Data
Mar. 26, 2007 (JP) .................. 2007-078294

(51) Int. Cl.
*F21V 7/04* (2006.01)
(52) U.S. Cl.
USPC ........... 362/618; 362/627; 362/558; 362/559; 349/64; 349/65
(58) Field of Classification Search .................. 362/558, 362/599, 618, 627, 559; 349/64, 65
See application file for complete search history.

(56) References Cited

U.S. PATENT DOCUMENTS

| | | | |
|---|---|---|---|
| 5,852,514 A | 12/1998 | Toshima et al. | 359/599 |
| 6,602,596 B2 * | 8/2003 | Kimura et al. | 428/327 |
| 2004/0165371 A1 * | 8/2004 | Kitamura et al. | 362/31 |
| 2006/0147676 A1 | 7/2006 | Yoshida | 428/143 |
| 2009/0034287 A1 | 2/2009 | Nagasawa et al. | |
| 2009/0067190 A1 * | 3/2009 | Funabashi et al. | 362/558 |

FOREIGN PATENT DOCUMENTS

| | | |
|---|---|---|
| CN | 1603864 A | 4/2005 |
| CN | 1646948 A | 7/2005 |
| CN | 1900786 A | 1/2007 |
| JP | 2002-245824 | 8/2002 |
| JP | 2003-315560 | 11/2003 |

* cited by examiner

*Primary Examiner* — Stephen F Husar
(74) *Attorney, Agent, or Firm* — Bacon & Thomas, PLLC

(57) ABSTRACT

A backlight unit does not show decrease of brightness for the frontal direction even when made thin-shaped. An edge light type backlight unit 1 includes a light conducting plate 14, a light source 13 disposed along at least one end portion of the light conducting plate 14, and a light diffusing film 15 disposed on a light projecting surface of the light conducting plate 14. The light conducting plate 14 has a thickness of 1.0 mm or smaller, the light diffusing film 15 has a light diffusing layer formed from a binder resin and a light diffusing agent, wherein the coefficient of variation of particle size distribution of the light diffusing agent is in the range of 30% or smaller.

11 Claims, 2 Drawing Sheets

BACKLIGHT UNIT

TECHNICAL FIELD

The present invention relates to a thin-shaped backlight unit, especially a backlight unit of which brightness for the frontal direction is not decreased even when a thin-shaped light conducting plate is used.

BACKGROUND ART

As backlight units for liquid crystal displays etc., there are backlight units of edge light type in which a light source is disposed along at least one end portion of a light conducting plate. In such backlight units, on a light projecting surface of the light conducting plate, a light diffusing film is laminated in order to make lights emitted from the light source uniform, and an optical member such as a prism sheet is laminated in order to increase brightness for the frontal direction (Patent document 1).

In recent years, in order to make backlight units thinner, number of optical members constituting the backlight units is reduced, or optical members constituting the backlight units such as light conducting plate and others are made thinner.

However, there arises a problem that if a conventional light diffusing film is used with a light conducting plate made thinner in order to attain thinner shape, brightness for the frontal direction of the backlight unit is reduced.

Patent document 1: Japanese Patent Unexamined Publication (KOKAI) No. 9-127314 (claim 1, paragraph 0034)

DISCLOSURE OF THE INVENTION

Object to be Achieved by the Invention

Therefore, an object of the present invention it to provide a backlight unit which does not show decrease of brightness for the frontal direction even when it is made into such a thin-shaped backlight unit.

Means for Achieving the Object

As a result of various researches conducted in order to achieve the aforementioned object, it was found that in a thin light conducting plate, of lights entered into the light conducting plate from the light source, lights projected from the light conducting plate along the direction of 0°, which means the direction of the normal of the light projecting surface of the light conducting plate, decrease, and lights projected from the light conducting plate along the directions of 60 to 90° increase, compared with those obtainable with a conventional light conducting plate, and therefore brightness for the frontal direction of a backlight unit using such a thin light conducting plate is decreased, and that since light diffusing films used for the conventional backlight units are designed to meet light projection characteristics of a light conducting plate having a relatively large thickness, it could not improve brightness for the frontal direction of such a thin light conducting plate in a backlight unit comprising such a conventional light diffusing film and the thin light conducting plate in combination, and thus the present invention was accomplished.

That is, the backlight unit of the present invention is an edge light type backlight unit comprising a light conducting plate, a light source disposed along at least one end portion of the light conducting plate, and a light diffusing film disposed on a light projecting surface of the light conducting plate, wherein the light conducting plate has a thickness of 1.0 mm or smaller, the light diffusing film has a light diffusing layer formed from a binder resin and a light diffusing agent, and the light diffusing agent has a coefficient of variation of particle size distribution of 30% or smaller.

In the backlight unit of the present invention, the light diffusing agent preferably has a coefficient of variation of particle size distribution of 10% or larger, and a mean particle size of 5 to 10 μm.

The light diffusing layer preferably has a thickness of 3 to 30 μm.

The mean particle sizes, and coefficients of variation of particle size distribution referred to in the present invention are values calculated from values measured by the Coulter counter method (weight distribution).

Effect of the Invention

In the backlight unit of the present invention, since a light diffusing agent having a coefficient of variation of particle size distribution in a specific range is used as the light diffusing agent contained in the light diffusing layer of the light diffusing film, the surface profile formed by the portions of particles protruding from the surface of the light diffusing layer (convex portions) can be made a relatively uniform surface profile having deep concaves, and thereby a large part of lights projected from the light conducting plate along the directions of 60 to 90° can be directed to the projection direction (frontal direction perpendicular to the light conducting plate). Moreover, since the coefficient of variation of particle size distribution is in the specific range, generation of interference pattern resulting from convex shapes can be suppressed.

Therefore, there can be provided a backlight unit which does not show reduction of brightness for the frontal direction even when a thin-shaped light conducting plate is used in it.

BEST MODE FOR CARRYING OUT THE INVENTION

Embodiments of the backlight unit of the present invention will be explained.

One embodiment of the edge light type backlight unit is shown in FIG. 1. As shown in the drawing, this backlight unit 1 comprises a light conducting plate 14, a light source 13 disposed along one end portion of the light conducting plate 14, and a light reflecting film 12 held in a chassis 11 and disposed on the surface of the light conducting plate 14 opposite to the light projecting surface. Further, a light diffusing film 15 and a prism sheet 16 are disposed on the light projecting surface of the light conducting plate 14. As the light diffusing film, for example, one comprising a base material and a light diffusing layer provided on one surface of the base material can be used.

As the light source of the backlight unit, cold-cathode tube, LED, and so forth can be used. The light source may be in, for example, a dot shape, a linear shape, or a U shape. Although the light source 15 is disposed along only one end portion of the light conducting plate 14 in the backlight unit shown in the drawing, it may be disposed along two or more end portions.

The light conducting plate is for conducting lights emitted from the light source disposed along at least one end portion along the plane direction, and one surface thereof approximately perpendicular to the end portion serves as a light projecting surface. As a material of the light conducting plate, resins used for usual light conducting plates can be used, and examples include amorphous olefin resins, polycarbonate resins, acrylic resins and so forth. Since a light conducting plate consisting of an amorphous olefin resin or polycarbonate resin shows superior characteristics for transparency, impact resistance, heat resistance, dimensional stability etc., such a light conducting plate is preferred.

Moreover, since the backlight unit of the present invention aims at realizing thinner backlight units, a light conducting plate having a thickness of 1.0 mm or smaller is used. A light conducting plate having a thickness of 800 μm or smaller is more preferred, and a light conducting plate having a thickness of 600 μm or smaller is particularly preferred. As for the lower limit of the thickness, the thickness is preferably 250 μm or larger in order to maintain impact resistance and mechanical strength of the light conducting plate.

As the thickness of the light conducting plate becomes thinner, the light projecting characteristics thereof change as follows. That is, as shown in FIG. 2, when the light source (lamp) is disposed along only one side of the light conducting plate, brightness ratio of lights projected from the light conducting plate for a specific projection angle extremely decreases at a projection angle of 0°, and tends to increase as the projection angle deviates from 0°, wherein the projection angle along the direction of the normal of the light projection surface of the light conducting plate is defined as 0°, the projection angle along the direction perpendicular to the direction of 0° and toward the side opposite to the side on which the lamp is disposed is represented as 90°, and the brightness ratio is a value obtained by dividing a brightness value for a specific projection angle or total of brightness values for projection angles in a specific range of the light conducting plate with total of brightness values for projection angles of 0 to 90° of the light conducting plate (henceforth referred to simply as "brightness ratio").

More specifically, in a common light conducting plate having a thickness larger than 1.0 mm, the brightness ratio for the directions of projection angles of 0 to 10° exceeds 5%, the brightness ratio for the directions of projection angles of 0 to 60° is about 55 to 70%, and the brightness ratio for the directions of projection angles of 60 to 90° is about 30 to 45%. On the other hand, in a thin light conducting plate having a thickness not larger than 1.0 mm, the brightness ratio for the directions of projection angles of 0 to 10° is about 0.1 to 3%, the brightness ratio for the directions of projection angles of 60 to 90° is about 55% or higher, and the brightness ratio for the directions of projection angles of 0 to 60° is about 0.1 to 45%.

As for the aforementioned brightness ratio, an approximate expression can be obtained from such a curve representing brightness values for every projection angle of a light conducting plate in the range of 0 to 90° (light projection characteristics) as shown in FIG. 3, and a brightness ratio at a specific projection angle of the lights emitted from the light conducting plate can be obtained from the approximate expression. FIG. 3 conceptually represents light projection characteristics, and actual light projection characteristics can be obtained by measuring brightness values for multiple projection angles, and plotting the values to the projection angles. Moreover, for simplification, the brightness ratio can be obtained by dividing a brightness value for a specific projection angle or a sum of brightness values for projection angles of a specific range with the simple sum of brightness values for projection angles of 0 to 90° of the light conducting plate.

The backlight unit of the present invention comprises a light conducting plate showing an extremely small brightness ratio around the projection angle of 0° as described above, but decrease of brightness for the frontal direction (direction of 0°) is prevented by using the specific light diffusing film described later in combination.

Specific configurations of the light diffusing film will be explained below.

The light diffusing film has a light diffusing surface for substantially uniformly diffusing lights emitted by the light source and passing through it. Such a light diffusing surface can be realized usually by preparing fine unevenness on the surface opposite to the surface on the side of the light conducting plate. A light diffusing surface having fine unevenness can be formed by providing a light diffusing layer containing a binder resin and a light diffusing agent on a base material.

The base material for forming the light diffusing film may be a base material showing high transparency, and there are used, for example, polymer films showing superior transparency formed from one or more kinds of resins selected from polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, vinyl resins, polyethylene resins, polystyrene resins, polypropylene resins, polyamide resins, polyimide resins, melamine resins, phenol resins, silicone resins, fluorocarbon resins, cyclic olefin resins, and so forth. In particular, biaxially stretched polyethylene terephthalate films are preferably used, because of superior mechanical strength and dimensional stability thereof. Further, those comprising such a transparent polymer film optionally provided with an adhesion promoting layer or the like are also preferably used. Although thickness of the base material is not particularly limited so long as any problem is not caused concerning handling thereof, it is about 10 to 250 μm, preferably 12 to 100 μm. In view of obtaining a thinner backlight unit, it is more preferably 50 μm or smaller.

Thickness of the light diffusing layer formed from a binder resin and a light diffusing agent is about 3 to 50 μm, more preferably 30 μm or smaller, particularly preferably 20 μm or smaller, as thickness of a portion where a convex is formed with the light diffusing agent. For making the thickness of light diffusing layer small and preventing decrease of brightness for the frontal direction, it is necessary to appropriately choose the binder resin and the light diffusing agent.

As the binder resin for forming the light diffusing layer, a resin showing superior optical transparency can be used, and for example, thermoplastic resins, thermosetting resins and ionizing radiation curable resins such as polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, polyethylene resins, polystyrene resins, polyamide resins, polyimide resins, melamine resins, phenol resins and silicone resins, and so forth can be used. Among these, acrylic resins showing superior optical characteristics are preferably used.

As the light diffusing agent for forming the light diffusing layer, inorganic microparticles such as those of silica, clay, talc, calcium carbonate, calcium sulfate, barium sulfate, aluminum silicate, titanium oxide, synthetic zeolite, alumina, and smectite, as well as organic microparticles such as those of styrene resin, urethane resin, benzoguanamine resin, silicone resin, and acrylate resin can be used.

Although shape of the light diffusing agent is not particularly limited, spherical organic microparticles which show superior light diffusing property are preferred. The mean particle size is preferably 5 μm or larger, more preferably 8 μm or larger, as for the minimum mean particle size, and preferably 25 μm or smaller, more preferably 10 μm or smaller, as for the maximum mean particle size. When the mean particle size is 5 μm or larger, magnitude of the unevenness formed on the surface of the light diffusing layer with the light diffusing agent is prevented from becoming unduly small to decrease the brightness for the frontal direction. When the mean particle size is 25 μm or smaller, the light diffusing layer is prevented from having a large thickness due to a large mean particle size of the light diffusing agent.

As the light diffusing agent, one having a coefficient of variation of the particle size distribution of 30% or smaller, preferably 25% or smaller, is used. With the coefficient of variation of 30% or smaller, lights projected along the direction of 0° through the light diffusing film can be increased, even when the brightness ratio for the directions of projection angles of 60 to 90° of the light conducting plate increases, and thus brightness for the frontal direction of a backlight unit can be maintained to be high. That is, decrease of brightness for the frontal direction, which is caused by use of a thin-shaped light conducting plate, can be prevented. Further, the light diffusing agent preferably has a coefficient of variation of particle size distribution of 10% or larger. The coefficient of variation is preferably 10% or larger for preventing generation of interference patterns due to convex portions regularly arranged on the light diffusing layer.

Although ratio of the light diffusing agent relative to the binder resin cannot be generally defined since it may vary depending on mean particle size of the light diffusing agent used, thickness of the light diffusing layer etc., it is usually 100 to 250 parts by weight, preferably 130 to 210 parts by weight, with respect to 100 parts by weight of the binder resin. With an amount of 100 parts by weight or more, sufficient light diffusing property can be obtained. Further, with an amount of 250 parts by weight or less, strength of the layer as a coated layer can be maintained.

On the surface of the light diffusing film on which the light diffusing layer is not provided, a back coat layer may be formed for preventing curling or scratches.

All the layers of the light diffusing film explained above can be formed by determining constituent components of each layer and other components as required, dissolving or dispersing them in an appropriate solvent to prepare a coating solution or dispersion, applying the coating solution or dispersion by a known method such as roll coating, bar coating, spray coating and air knife coating, drying the coated solution or dispersion, and optionally curing the dried layer by an appropriate curing method.

Since the backlight unit of the present invention utilizes the aforementioned light diffusing film, it can suppress increase of the brightness ratio for the directions of projection angles of 60 to 90° of the light conducting plate, which cannot be suppressed with other light diffusing films, and suppress decrease of brightness for the frontal direction, which is caused by the aforementioned increase of the brightness ratio. Therefore, high brightness for the frontal direction can be provided while realizing a light conducting plate having a thickness of 1 mm or smaller. Moreover, although usual backlight units use two of prism sheets as optical films, the number of the prism sheets can be reduced to one in the backlight unit of the present invention, and yet decrease of brightness caused thereby can be suppressed, because the light diffusing film itself has a function of increasing brightness for the frontal direction. Therefore, not only the effect that the light conducting plate can be made thinner is obtained, but also the backlight unit can be made further thinner by the thickness of one prism sheet.

Since the backlight unit of the present invention provides high brightness for the frontal direction and small light diffusion, it can provide a narrow viewing angle, and thus is suitable for uses in cellular phones and so forth.

EXAMPLES

Hereafter, the present invention will be further explained with reference to examples. The term and symbol "part" and "%" are used on weight basis, unless particularly indicated.

1. Production of Light Diffusing Films

Example 1

A coating dispersion for light diffusing layer having the following composition was applied to one surface of a transparent polymer film having a thickness of 100 μm (Lumirror T60, Toray Industries, Inc.) by bar coating, and cured by heating to form a light diffusing layer having a thickness of about 11 μm. Further, a coating dispersion for back coat layer having the following composition was applied by bar coating to the surface of the transparent polymer film opposite to the surface on which the light diffusing layer was formed, and cured by heating to form a coated film having a thickness of about 3 μm, and thereby produce a light diffusing film of Example 1.

<Coating Dispersion for Light Diffusing Layer>

| | |
|---|---|
| Acryl polyol | 10 parts |
| (ACRYDIC A-807, Dainippon Ink & Chemicals, Inc., solid content: 50%) | |
| Polymethyl methacrylate true spherical particles | 10 parts |
| (coefficient of variation: 20%, mean particle size: 8 μm) | |
| Dilution solvent | 36 parts |
| Curing agent (Takenate D110N, Mitsui Chemicals, Inc., solid content: 60%) | 2 parts |

<Coating Dispersion for Back Coat Layer>

| | |
|---|---|
| Acryl polyol | 10 parts |
| (ACRYDIC A-807, Dainippon Ink & Chemicals, Inc., solid content: 50%) | |
| Polyethylene wax | 0.022 part |
| (Ceridust 3620, Clariant Japan K.K., mean particle size: 8 μm) | |
| Dilution solvent | 36 parts |
| Curing agent (Takenate D110N, Mitsui Chemicals, Inc., solid content: 60%) | 2 parts |

Examples 2 to 9 and Comparative Examples 1 to 5

Light diffusing films of Examples 2 to 9 and Comparative Examples 1 to 5 were produced in the same manner as that of Example 1, except that the polymethyl methacrylate true spherical particles contained in the coating dispersion for light diffusing layer of Example 1 were changed to polymethyl methacrylate true spherical particles having the mean particle sizes and the coefficients of variation shown in Table 1. As for the thickness of the light diffusing layer used in the examples and comparative examples, brightness was changed with the thickness of the light diffusing layer depending on the used light diffusing agents, and therefore a thickness providing the highest brightness was used for each example.

2. Production of Backlight Units

The light diffusing films of Examples 1 to 9 and Comparative Examples 1 to 5 were each disposed on a light conducting plate consisting of a polycarbonate resin having a thickness of 0.6 mm so that the surface of each light diffusing film on the light diffusing layer side should serve as a light projecting surface, and four LED lamps were disposed along one end portion of the light conducting plate to produce 2.4-inch edge light type backlight units (1 inch=2.54 cm) as backlight units of Examples 1 to 9 and Comparative Examples 1 to 5. Brightness of the light projecting surface of the light conducting plate was measured without disposing the light diffusing film at the center of the light projecting surface of the light conducting plate and at every projection angle in the range of projection angles 0 to 90°, which correspond to the angles of from the frontal direction to the direction opposite to the lamps. Then, brightness ratios for specific ranges of projection angles were calculated. As a result, the brightness ratio for the directions of projection angles of 60 to 90° was 67%, and the brightness ratio for the directions of projection angles of 0 to 10° was 0.4%. The brightness ratio for the directions of projection angles of 0 to 60° was 33%.

Reference Examples 1 to 3

Further, the light diffusing films of Examples 1, and Comparative Examples 1 and 2 were each disposed on a light conducting plate consisting of an acrylic resin having a thickness of 3 mm so that the surface of each light diffusing film on the light diffusing layer side should serve as a light projecting surface, and one each of cold cathode tube was disposed on two facing end portions of the light conducting plate to produce 15-inch edge light type backlight units (1 inch=2.54 cm) as backlight units of Reference Examples 1 to 3. Brightness of the light projecting surface of the light conducting plate was measured without disposing the light diffusing film, with turning on one of the two lamps, at the center of the light projecting surface of the light conducting plate and at every projection angle in the range of projection angles 0 to 90°, which correspond to the angles of from the frontal direction to the direction opposite to the lamp turned on. Then, brightness ratios for specific ranges of projection angles were calculated. As a result, the brightness ratio for the directions of projection angles of 60 to 90° was 42%, and the brightness ratio for the directions of projection angles 0 to 10° was 6%. The brightness ratio for the directions of projection angles 0 to 60° was 58%.

3. Evaluation

Measurement of Brightness for the Frontal Direction

One prism sheet was further disposed on the light diffusing film of each of the backlight units of Examples 1 to 9, Comparative Examples 1 to 5, and Reference Examples 1 to 3, and brightness for the frontal direction was measured at the center of the backlight unit. The results are shown in Table 1.

Evaluation of Interference Pattern

The light diffusing layer surfaces of the light diffusing films of Examples 1 to 9 and Comparative Examples 1 to 5 were observed by shading light of fluorescent lamp with the films. The results were indicated with "C" when there was not interference pattern, and with "L" when there was interference pattern. The results are shown in Table 1.

TABLE 1

| | Mean particle size (µm) | Coefficient of variation (%) | Thickness of light diffusing layer (µm) | Brightness for frontal direction (cd/m$^2$) | Interference pattern |
|---|---|---|---|---|---|
| Example 1 | 8 | 20 | 11 | 3001 | ◯ |
| Example 2 | 8 | 28 | 11 | 2948 | ◯ |
| Example 3 | 5 | 24 | 6 | 2911 | ◯ |
| Example 4 | 10 | 19 | 11 | 2932 | ◯ |
| Example 5 | 18 | 24 | 28 | 2918 | ◯ |
| Example 6 | 8 | 8 | 11 | 3022 | Δ |
| Example 7 | 5 | 9 | 8 | 2924 | Δ |
| Example 8 | 10 | 8 | 15 | 2971 | Δ |
| Example 9 | 30 | 8 | 55 | 2985 | Δ |
| Comparative Example 1 | 8 | 34 | 8 | 2871 | ◯ |
| Comparative Example 2 | 5 | 34 | 6 | 2847 | ◯ |
| Comparative Example 3 | 10 | 32 | 14 | 2866 | ◯ |
| Comparative Example 4 | 20 | 37 | 28 | 2743 | ◯ |
| Comparative Example 5 | 30 | 36 | 48 | 2910 | ◯ |
| Reference Example 1 | 8 | 20 | 11 | 3047 | — |
| Reference Example 2 | 8 | 34 | 8 | 3025 | — |
| Reference Example 3 | 20 | 37 | 28 | 3051 | — |

As seen from the results shown in Table 1, high brightness for the frontal direction higher than 2900 cd/m$^2$ was obtained for all the backlight units of Examples 1 to 9, in which the coefficients of variation of the light diffusing agent were smaller than 30%. In particular, in the backlight units of Examples 1 to 5, in which the coefficients of variation of the light diffusing agent was larger than 10%, surface irregularity was imparted in a certain degree by the particle size distribution, and therefore generation of interference pattern was not observed, either. On the other hand, in the backlight units of Comparative Examples 1 to 5, in which the coefficients of variation were larger than 30%, improvement in brightness for the frontal direction was not observed as a whole compared with the results obtained in Examples 1 to 9, although brightness for the frontal direction higher than 29.00 cd/m$^2$ was obtained in Comparative Example 5, in which a light diffusing agent having a large mean particle size was used.

The aforementioned tendency is clear also from comparison of the results of the examples and comparative examples in which light diffusing agents having the same mean particle size, but different coefficients of variation were used. FIG. 4 is a graph showing relationship between the coefficient of variation and brightness for the frontal direction (measured value) plotted for each of light diffusing agents having different mean particle sizes. As shown in the graph of FIG. 4 (solid line), from the results of Examples 1, 2, and 6 and Comparative Example 1 in which the mean particle size of the light diffusing agent was 8 µm, correlation between the coefficient of variation and brightness for the frontal direction was clearly recognized, and decrease of brightness for the frontal direction with increase in the coefficient of variation was clearly confirmed. Similarly, from the curve obtained by plotting the results of Examples 3 and 7 and Comparative Example 2 in which the mean particle size of the light diffusing agent was 5 µm (broken line) and the curve obtained by plotting the results of Examples 4 and 8 and Comparative Example 3 in which the mean particle size was 10 µm (alternate long and short dash line), clear decrease of brightness for the frontal direction accompanying increase in the coefficient of variation was also confirmed.

Although similar tendency was also confirmed in comparison of the results of Example 9 and Comparative Example 5 in which the mean particle size was 30 µm, influence of the coefficient of variation on the brightness for the frontal direction was smaller than that observe in the cases utilizing a smaller mean particle size. It is considered that this was because in a light diffusing film using a light diffusing agent having a relatively large mean particle size, thickness of the light diffusing layer for obtaining optimal brightness became larger, therefore particles having a small particle size were buried in the layer, particles having a large particle size mainly governed the surface profile, and therefore it became unlikely to be affected by the coefficient of variation.

Moreover, in the cases of the light diffusing films using a light diffusing agent having a mean particle size of 10 µm or smaller, the thickness of the light diffusing layer providing the highest brightness could be suppressed to be 15 µm or smaller, and therefore the thickness as the backlight unit could be decreased.

The light conducting plates used for Reference Examples 1 to 3 showed a brightness ratio of 52% for the directions of projection angles of 0 to 60° of lights projected from the light conducting plates after entering from a light source, and showed comparatively small change of ratio of lights projected for different angles. When such a light conducting plate was used, difference of the brightness for the frontal direction due to the difference in the coefficient of variation of particle size distribution of the light diffusing agent used for the light diffusing layer was not substantially observed between the backlight units of Reference Examples 1 and 2. Similarly, difference of brightness for the frontal direction was scarcely observed between the backlight units of Reference Examples 1 and 3.

However, as also seen from the difference in the brightness for the frontal direction of the backlight units of Comparative Example 1 (thickness of light conducting plate: 0.6 mm) and Reference Example 2 (thickness of light conducting plate: 3 mm), and the difference in the backlight units of Comparative Example 4 (thickness of light conducting plate: 0.6 mm) and Reference Example 3 (thickness of light conducting plate: 3 mm), the backlight units of Comparative Examples 1 and 4 utilizing a light diffusing film, in which a light diffusing agent showing a coefficient of variation of particle size distribution larger than 30% was used in the light diffusing layer, together with a light conducting plate showing a small brightness ratio for the directions of projection angles of 0 to 10° and a large brightness ratio for the directions of projection angles of 60 to 90° (light conducting plate having a thickness smaller than 1 mm), showed more marked decrease of brightness for the frontal direction compared with the cases utilizing a thicker light conducting plate.

On the other hand, the backlight unit of Reference Example 1 (thickness of light conducting plate: 3 mm) showed extremely high brightness for the frontal direction as high as 3047 cd/m², and the backlight unit of Example 1 (thickness of light conducting plate: 0.6 mm) using the same light diffusing film also showed high brightness for the frontal direction as high as 3001 cd/m². From these results, it was found that when a light diffusing film using a light diffusing agent having a coefficient of variation for particle size distribution of 20% in the light diffusing layer is used together with a light conducting plate showing a small brightness ratio for the directions of projection angles of 0 to 10° and a large brightness ratio for the directions of projection angles of 60 to 90° (light conducting plate having a thickness smaller than 1 mm), brightness for the frontal direction almost equivalent to that obtainable by using a thick light conducting plate could be secured, and decrease of brightness for the frontal direction could be prevented.

EXPLANATION OF NUMERAL NOTATIONS

Figure 1:
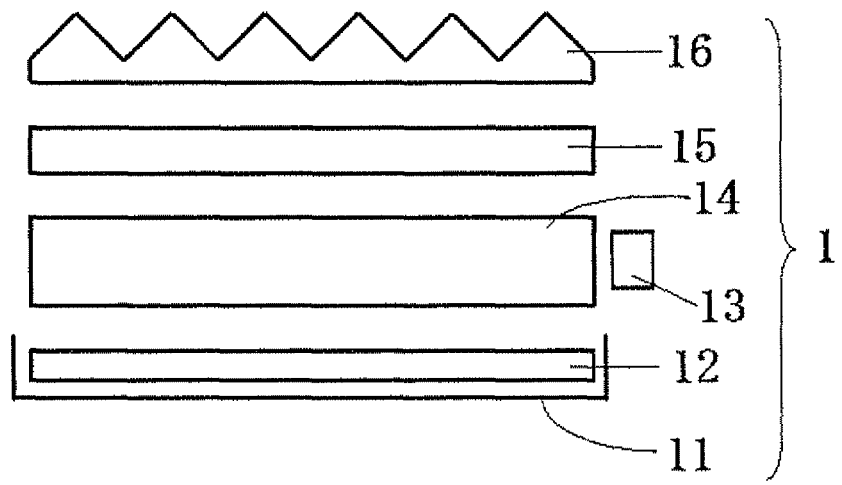
FIG. 1 A sectional view showing an example of edge light type backlight unit.
Figure 2:
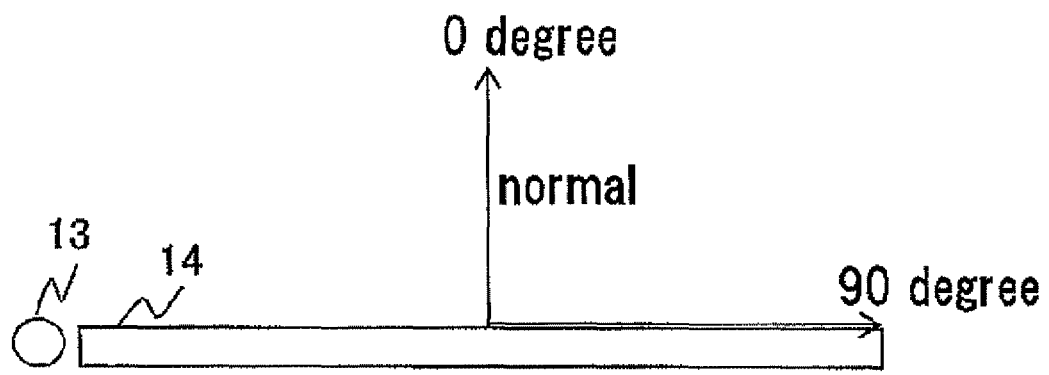
FIG. 2 A drawing for explaining light projection angle of a light conducting plate.
Figure 3:
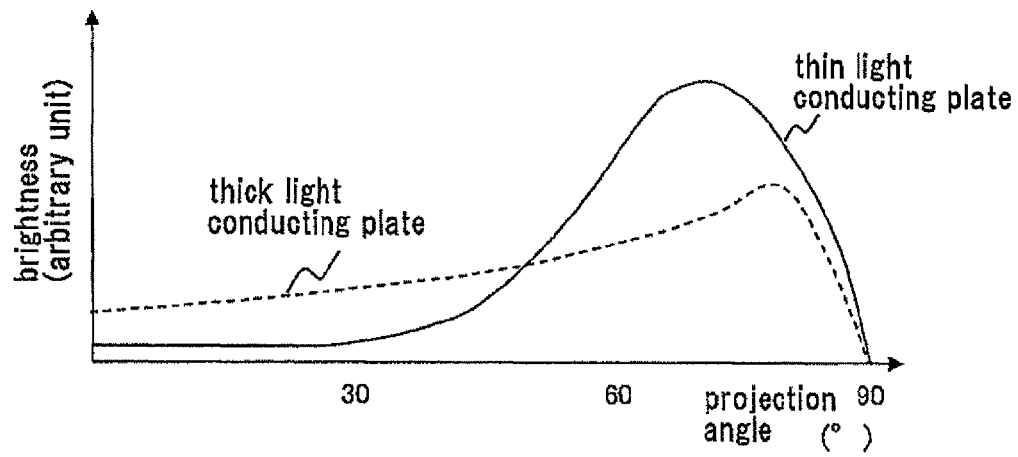
FIG. 3 A drawing schematically showing light projection characteristics of a light conducting plate.
Figure 4:
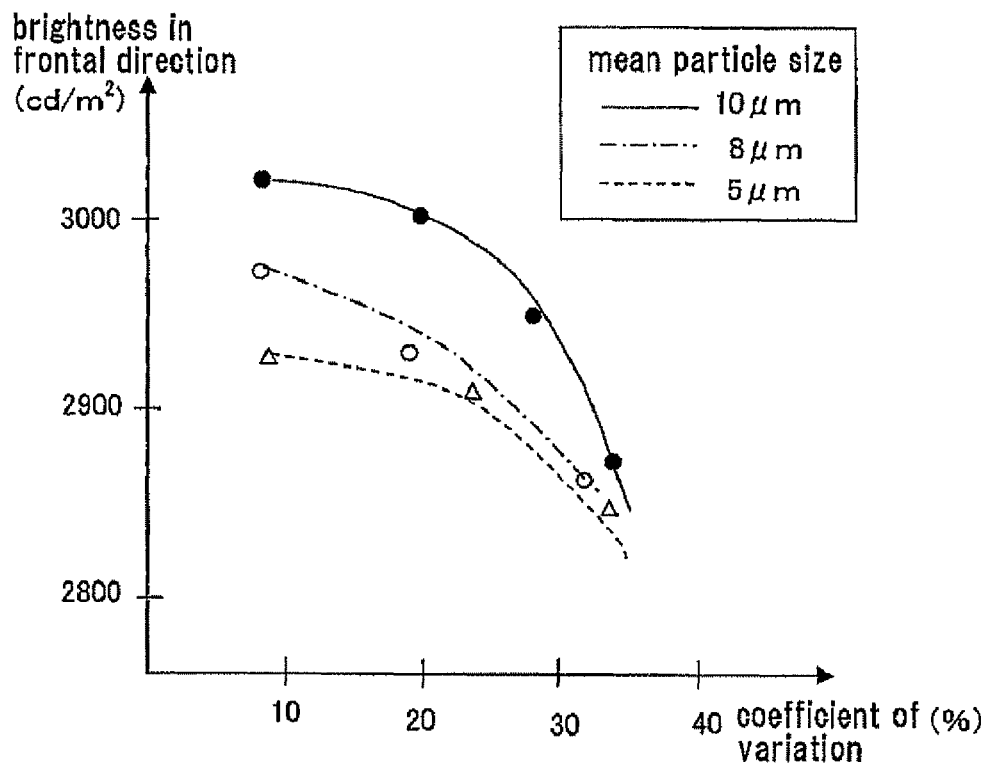
FIG. 4 A graph showing difference in brightness for the frontal direction depending on coefficient of variation of particle size of a light diffusing agent.

| | |
|---|---|
| 1 | Edge light type backlight unit |
| 11 | Chassis |
| 12 | Light reflecting film |
| 13 | Light source |
| 14 | Light conducting panel |
| 15 | Light diffusing film |
| 16 | Prism sheet |

The invention claimed is:

1. An edge light type backlight unit comprising a light conducting plate, a light source disposed along at least one end portion of the light conducting plate, and a light diffusing film disposed on a light projecting surface of the light conducting plate;
   wherein the light conducting plate has a thickness of 1.0 mm or smaller, the light diffusing film has a light diffusing layer formed from a binder resin and a light diffusing agent, and the light diffusing agent has a coefficient of variation of particle size distribution of 30% or smaller and a mean particle size of 5 to 10 µm.

2. The backlight unit according to claim 1, wherein the light diffusing agent has a coefficient of variation of particle size distribution of 10%-30%.

3. The backlight unit according to claim 1, wherein the light diffusing layer has a thickness of 3 to 30 µm.

4. The backlight unit according to claim 1, wherein the light diffusing layer contains 100 to 250 parts by weight of the light diffusing agent with respect to 100 parts by weight of the binder resin.

5. The backlight unit according to claim 2, wherein the light diffusing layer has a thickness of 3 to 30 µm.

6. The backlight unit according to claim 2, wherein the light diffusing layer contains 100 to 250 parts by weight of the light diffusing agent with respect to 100 parts by weight of the binder resin.

7. The backlight unit according to claim 3, wherein the light diffusing layer contains 100 to 250 parts by weight of the light diffusing agent with respect to 100 parts by weight of the binder resin.

8. The backlight unit according to claim 2, wherein the light diffusing agent has a mean particle size of 5 to 10 µm.

9. The backlight unit according to claim 8, wherein the light diffusing layer has a thickness of 3 to 30 μm.

10. The backlight unit according to claim 9, wherein the light diffusing layer contains 100 to 250 parts by weight of the light diffusing agent with respect to 100 parts by weight of the binder resin.

11. The backlight unit according to claim 8, wherein the light diffusing layer contains 100 to 250 parts by weight of the light diffusing agent with respect to 100 parts by weight of the binder resin.

* * * * *